April 24, 1973     H. D. SWARTZ     3,729,357

THERMOPLASTIC HEAT SEALING APPARATUS

Filed June 25, 1971     6 Sheets-Sheet 1

INVENTOR
HENRY D. SWARTZ
BY Morse, Altman & Oates
ATTORNEYS

April 24, 1973 H. D. SWARTZ 3,729,357
THERMOPLASTIC HEAT SEALING APPARATUS
Filed June 25, 1971 6 Sheets-Sheet 4

INVENTOR
HENRY D. SWARTZ
BY
Morse, Altman + Oates
ATTORNEYS

April 24, 1973  H. D. SWARTZ  3,729,357
THERMOPLASTIC HEAT SEALING APPARATUS
Filed June 25, 1971  6 Sheets-Sheet 5

INVENTOR
HENRY D. SWARTZ
BY
Morse, Altman & Oates
ATTORNEYS

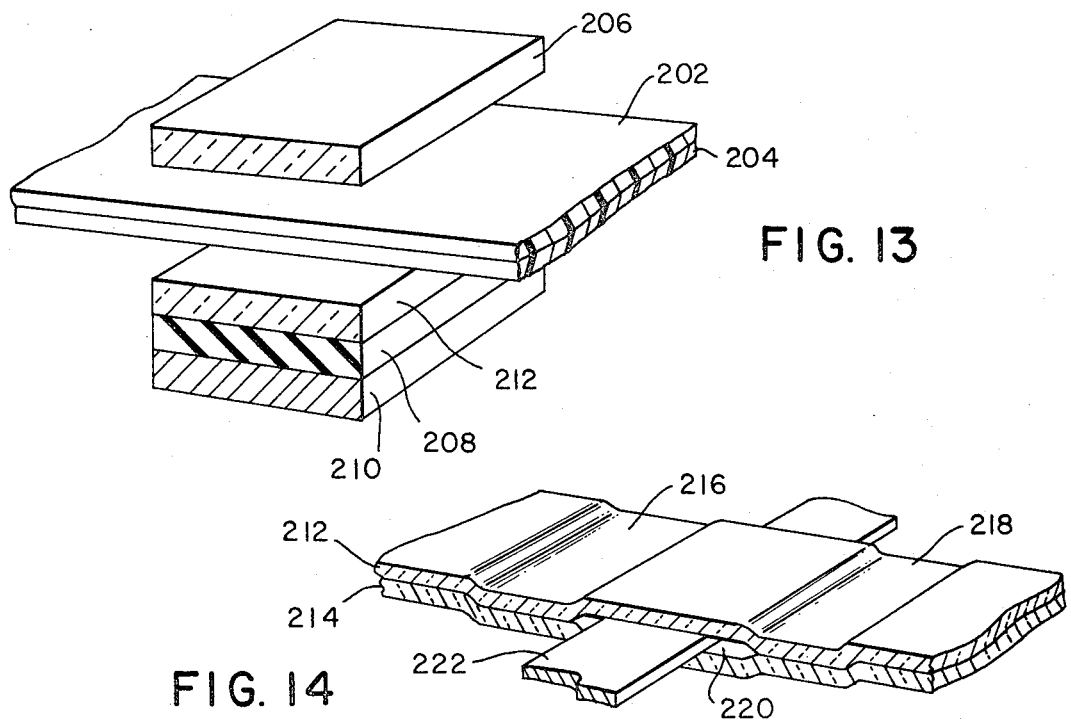
FIG. 13
FIG. 14
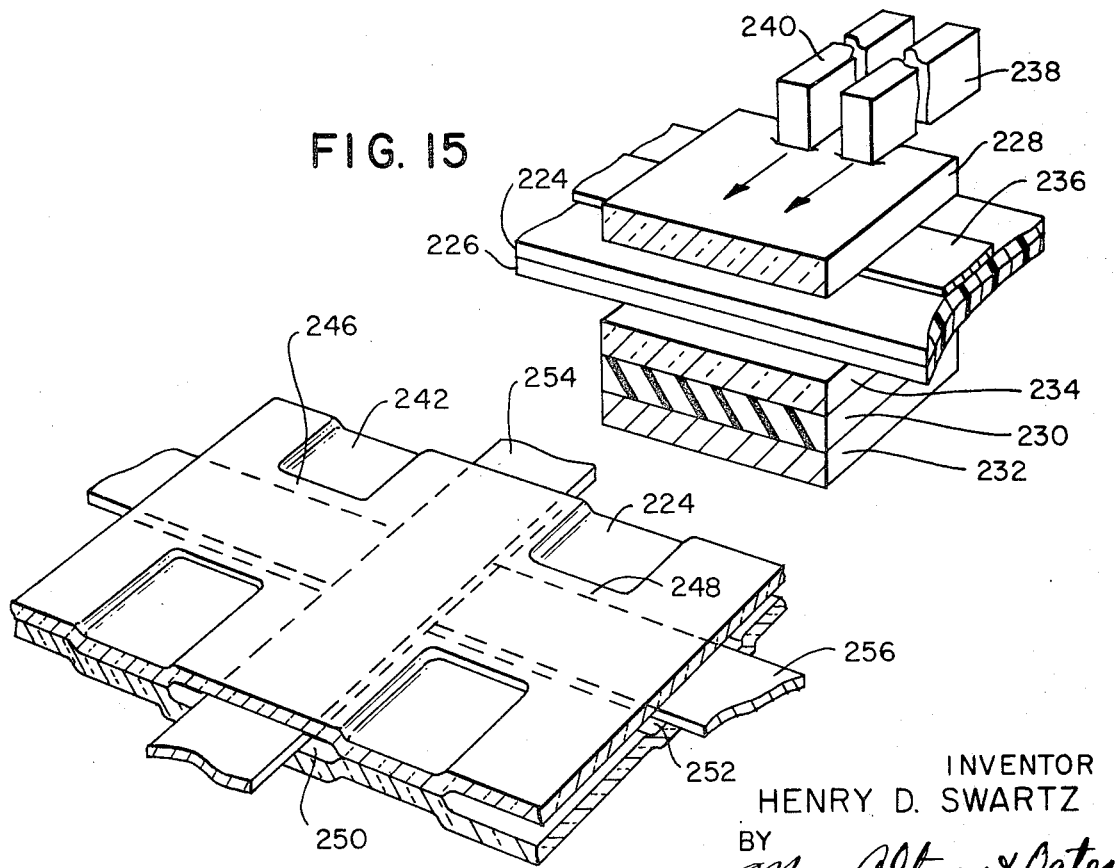
FIG. 15
FIG. 16
INVENTOR
HENRY D. SWARTZ
BY Morse, Altman & Oates
ATTORNEYS

United States Patent Office 3,729,357
Patented Apr. 24, 1973

3,729,357
THERMOPLASTIC HEAT SEALING APPARATUS
Henry D. Swartz, Chestnut Hill, Mass., assignor to General Heat Sealing Corporation, Braintree, Mass.
Filed June 25, 1971, Ser. No. 156,865
Int. Cl. B29c *19/02*
U.S. Cl. 156—380          11 Claims

ABSTRACT OF THE DISCLOSURE

A linearly extending seal or weld between a pair of heat susceptible thermoplastic sheets is produced by interposing the thermoplastic sheets in superposition between a pair of heat resistant control sheets, and sliding an elongated heating wiper along its axis in contact with one of the control sheets in order to apply heat and pressure to the thermoplastic sheets while countered by the other of the control sheets. The result is a weld characterized by a trough at one face of the superposed thermoplastic sheets and a ridge at the other face of the superposed thermoplastic sheets, the trough and the ridge being in registration and the region therebetween being integrated. Apparatus for effecting this process and producing this product is disclosed.

BACKGROUND AND SUMMARY

The present invention relates to the welding of thermoplastic sheets and, more particularly, to devices, methods and products involving welding a pair of thermoplastic strata together along one or more lines for use in construction materials and other products. For example, in one such product, the double-wall plastic panelling provides channels, disposed between pairs of welds, through which rigid or flexible rods, cables or straps may be inserted to form rigid or flexible walls, roofs, coverings, etc. Difficulties have been encountered in producing seams of uniform appearance and strength throughout thermoplastic sheeting of large area. Such has been the case particularly with sheets of certain polymeric composition, particularly polyolefin composition, e.g. polyethylene or polypropylene, which sheets in general have been difficult to weld to each other because of their peculiar polymeric structure, particularly when in relatively heavy gauge.

The primary object of the present invention is the provision of devices, methods and products involving the production of one or more linearly extending seals or welds between a pair of heat susceptible thermoplastic sheets by interposing the thermoplastic sheets in superposition between a pair of heat resistant control sheets, and sliding an elongated heating wiper along its axis in contact with one of the control sheets in order to apply heat and pressure to the thermoplastic sheets while countered by the other of the control sheets. The control sheet with which the heating wiper is in contact preferably has a softening point at least 20% higher than the softening point of the thermoplastic sheets, typically being a high melting point flexible polyester or fluorinated olefin. The control sheet remote from the heating wiper preferably has a softening point at least 20% higher than the softening point of the thermoplastic sheets, typically being a high melting point elastomer, particularly a silicone rubber, backed by a rigid platen. The result is a weld, characterized by a trough at one face of the thermoplastic sheets and a ridge at the other face of the thermoplastic sheets, the region between the ridge and the trough being integrated without appreciable decrease in thickness with respect to the overall thickness of the combined thermoplastic sheets in regions adjoining the welded region. One aspect of the present invention contemplates pre-cooling and post-cooling the control sheets along the line of travel of the heating wiper in order to predetermine the heat applied to successive increments of the thermoplastic sheets for any selected speed of the heating wiper. Another aspect of the present invention contemplates the provision of a plurality of such heating wipers in order to produce predeterminedly spaced seals.

Other objects of the present invention will in part be obvious and will in part appear hereinafter.

The invention accordingly comprises the devices, processes and products, together with their steps, parts, components, and interrelationships, which are exemplified in the present disclosure, the scope of which will be indicated in the appended claims.

BRIEF DESCRIPTION OF THE DRAWINGS

For a fuller understanding of the nature and objects of the present invention, reference should be had to the following detailed disclosure, taken in connection with the accompanying drawings, wherein:

FIG. 13 illustrates materials, exaggerated in cross-section for clarity, undergoing another alternative process in accordance with the present invention;

FIG. 14 illustrates a product of the present invention;

FIG. 15 illustrates materials, exaggerated in cross-section for clarity, undergoing a further alternative process in accordance with the present invention; and FIG. 16 illustrates another product of the present invention.

DETAILED DESCRIPTION

Figure 1:
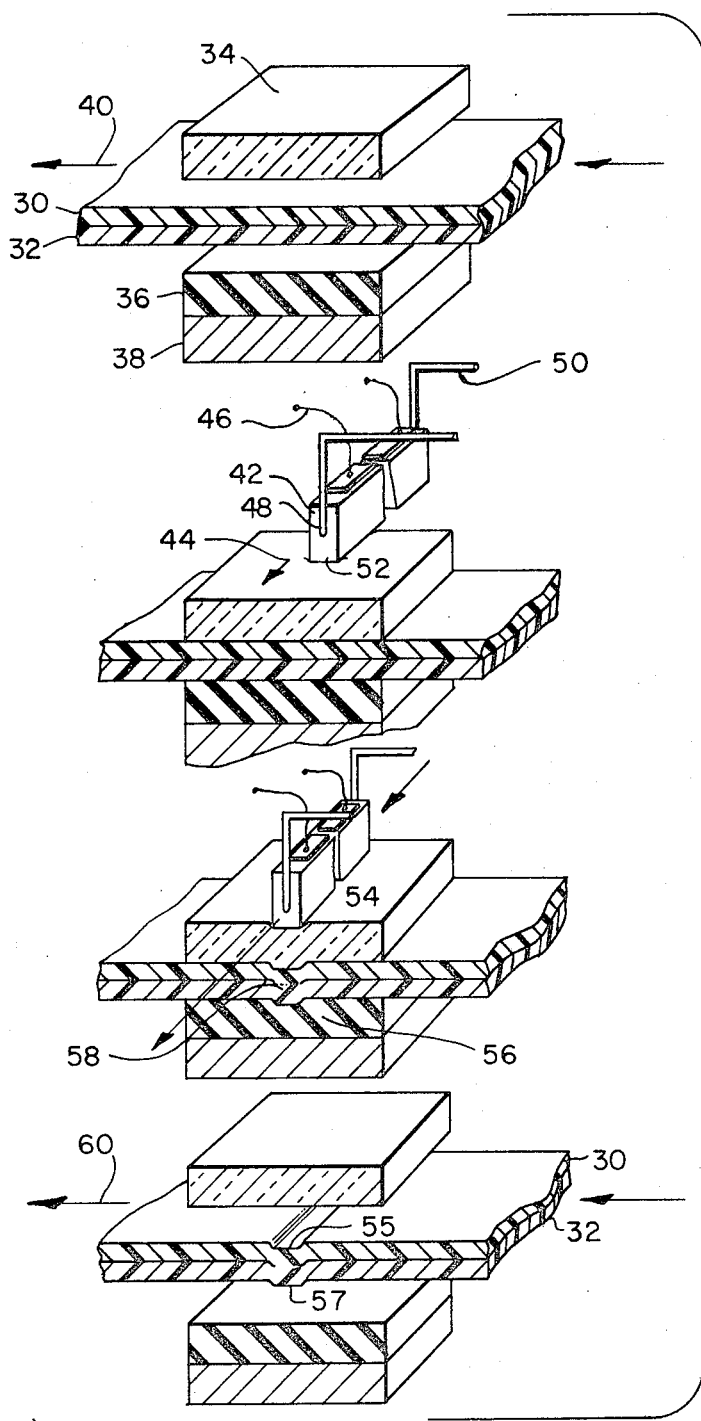
FIG. 1 illustrates materials, exaggerated in cross-section for clarity, undergoing a process of the present invention.

Generally, the process illustrated in FIG. 1 comprises the following steps. First a pair of thermoplastic sheets 30, 32 to be welded are advanced between a pair of heat resistant control sheets 34, 36, control sheet 34 having a flexibly free central portion and fixedly mounted edge portions, and control sheet 36 being composed of an elastomer and being backed by a rigid platen. Both control sheets are chemically incompatible with and have higher softening points than the thermoplastic sheets. Next, a heating wiper 42 is advanced in the direction 44 along its longitudinal axis, which is parallel to the plane of control sheet 34, so that its lower edge 52 remains in contact with any particular increment of control sheet 34 for a time interval which is a function of the length of heating wiper 42 along its axis and the speed of its travel in contact with the particular increment. Heating wiper 42 is thermally controlled by an electrical resistance heating strip 46, and moves in association with a precooling air jet 48 and a post cooling air jet 50, which ensure predetermined heat transfer through control sheet 34 into thermoplastic sheets 30, 32 from heating wiper 42. In consequence, control sheets 34, 36 assume deformations 54, 56 in correspondence with the shape of the lower edge of heating wiper 42. Under the heat and pressure applied by wiper 42, thermoplastic sheets 30, 32 become permanently welded at 58, retaining a trough and ridge configuration 55, 57 after separation from control sheets 34, 36, which reacquire their original flat faces as soon as heating platen 42 advances from contact therewith. The sealed increments of thermoplastic sheets 30 finally are advanced from between control sheets 34, 36 to permit repetition of the cycle.

Thermoplastic sheets 30, 32, for example, are composed of polyethylene, such as that sold under the trademark Visqueen, or rubber hydrochloride, such as that sold by Du Pont under the trademark Pliofilm.

Figure 3:
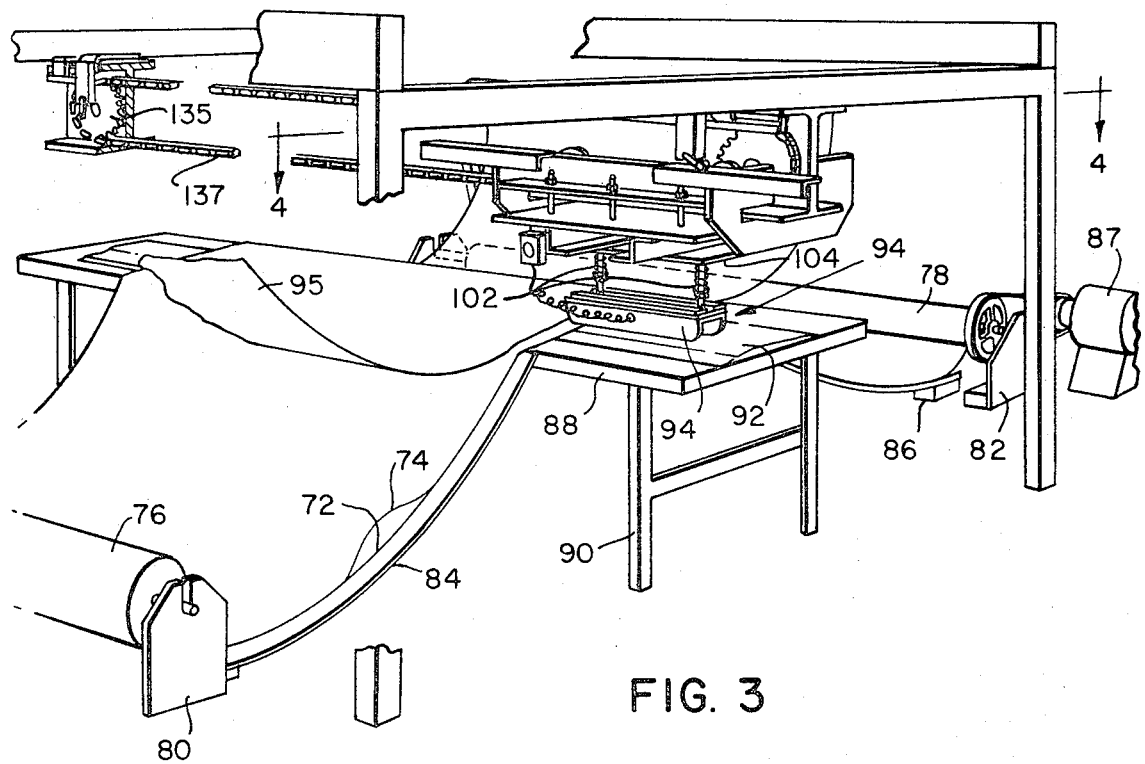
FIG. 3 is a perspective view, partly broken away, of an apparatus for performing the process of FIG. 1.

In an alternative embodiment, three or more chemically compatible thermoplastic sheets of the aforementioned types are provided with linear seals in accordance with the process of FIG. 1 and the apparatus of FIG. 3.

Figure 2:
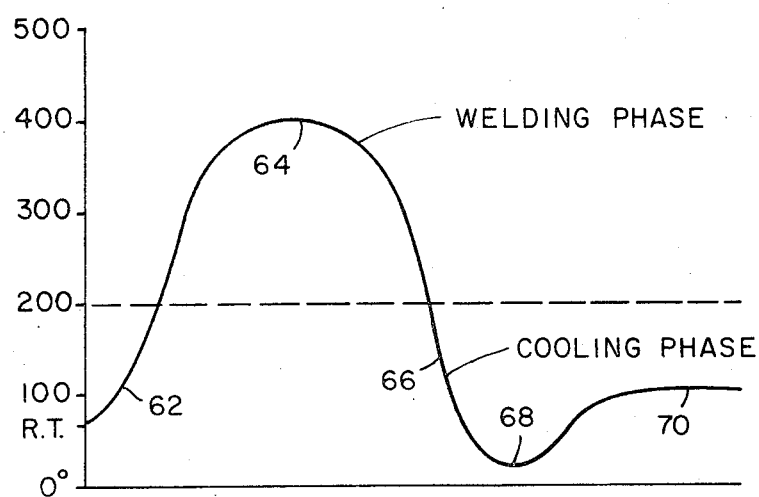
FIG. 2 is a graphic presentation illustrating certain principles of the present invention.

In operation, when the thermoplastic sheets are composed of such a material as polyethylene or rubber hydrochloride, the wiping action of heating element 42, preferably at a temperature ranging from 800 to 1000° F., causes a rise in temperature above the melting point of polyethylene or hydrochloride, e.g. a rise in temperature at from 300 to 400 degrees F. by advancing at a speed that establishes contact for a period ranging from 1 to 5 seconds per foot. Preferably the thickness of the sheets each ranges from .003 inch to .025 inch. Preferably the total thickness of the two or more sheets welded together in accordance with the present invention is at most .050 inch. Preferably, heating wiper 42 is composed of a metal such as steel, aluminum or bronze. Heating element 46, which is bolted to wiper 42, generates heat by electrical resistance, being composed of a high nickel-chromium alloy of the type sold by Emerson Electric Company under the trademark Chromalox. As shown in FIG. 2, the arrangement is such that the initial temperature of control sheet 34 at the path preceding the advancing wiper is at room temperature. As the heating wiper advances, any increment of control sheet 34 that it contacts rises to a dwell peak of 400° F. as at 64. When the heating wiper passes, the temperature of this increment drops below 400° F. as at 66. Finally, under the cooling stream of post cooling air, the temperature of this increment is reduced in temperature to a low point as at 60 and then to room temperature as at 70. It will be appreciated that because of the linear travel of the heating wiper, the weld time is controlled by the speed of advancement of the heating wiper, this speed being such as to be adjustable in order to achieve a virtually perfect seal.

Figure 1A:
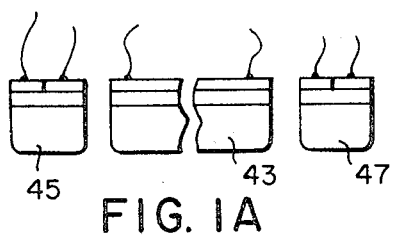
FIG. 1A illustrates a modification of one of the elements of FIG. 1.

A modification of the heating and cooling unit of FIG. 1 is shown in FIG. 1A as including a central heating wiper 43, which corresponds to heating wiper 42 of FIG. 1 and a pair of cooling wipers 45, 47 which correspond to pre-cooling and postcooling air jets 48, 50. Each of cooling wipers 45, 47, for example, is shown as including a thermoelectric junction which operates by the Peltier or a like cooling effect. In a further modification, the temperature of cooling wipers 45, 47 is controlled by a fluid coolant, for example, water or trichloromonofluoromethane, such as that sold by Du Pont under the trademark Freon.

Ordinarily, the control sheets have softening points above 600° F., control sheet 34 ranging from 2 to 10 mils in thickness and control sheet 36 ranging from 0.1 to 0.5 inch in thickness. Preferably, for example, control sheet 34 is composed of polyethylene terephthalate such as that sold by Du Pont under the trademark Mylar or tetrafluoroethylene such as that sold by Du Pont under the trademark Teflon. A particularly effective composition for control sheet 34 is polyethylene terephthalate reinforced with encapsulated glass strands. Preferably, control sheet 36 is composed of a silicone elastomer, generally characterized by atoms of silicone and oxygen with substituents on the silicone atoms to impart the elastomeric character. Specifically, silicone elastomers are compositions containing high molecular weight linear silicone polymer, finely divided silicone dioxide filler, and a peroxidic curing agent.

Figure 4:
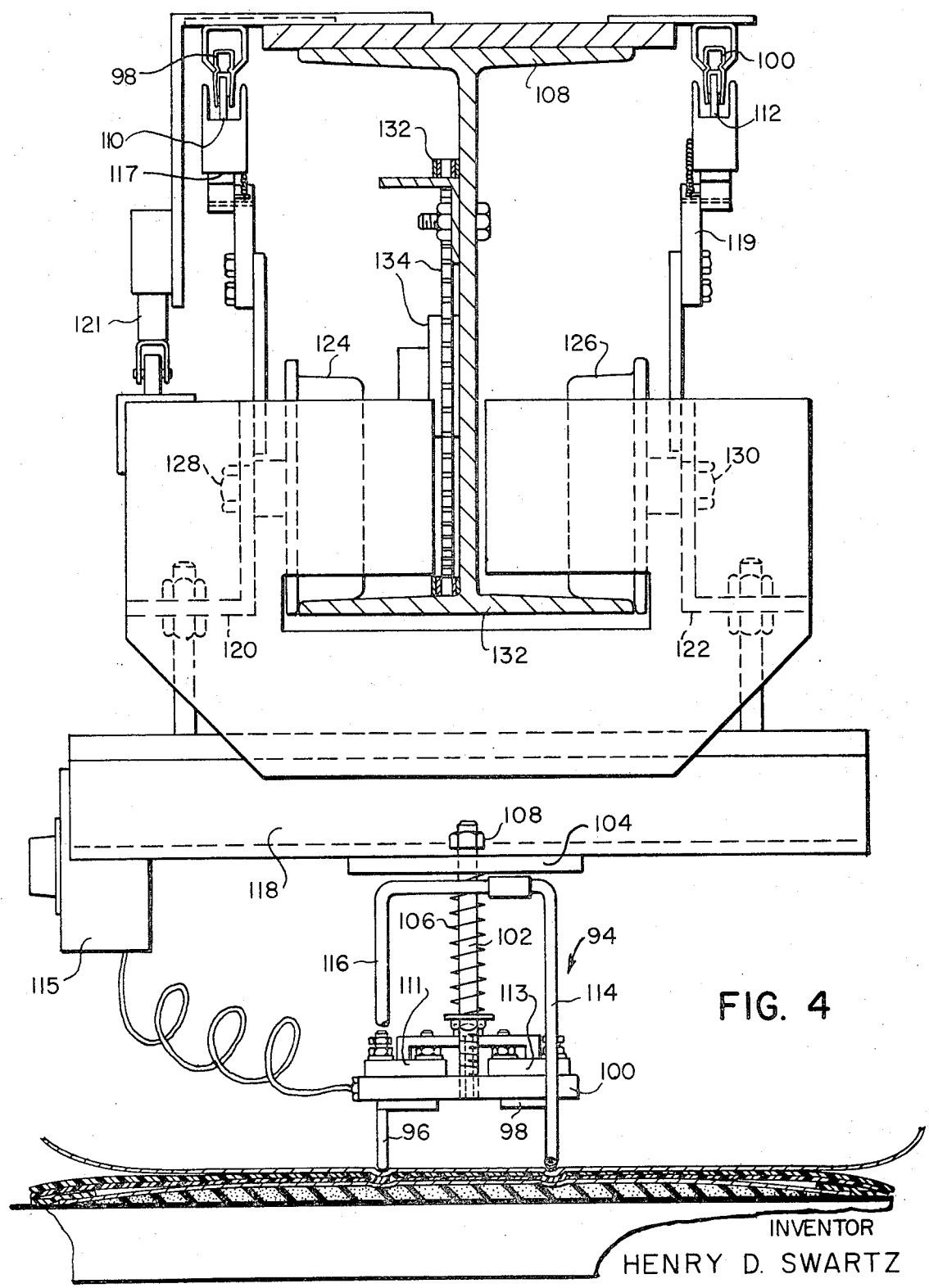
FIG. 4 is a cross-sectional view of a component of the apparatus of FIG. 3, the cross-section being taken substantially along the line 4—4 of FIG. 3.

FIGS. 3 and 4 illustrate an apparatus for performing the process of FIGS. 1 and 2. As shown, this apparatus is intended to weld a pair of spaced seams across a pair of thermoplastic sheets 72, 74, which extend from a supply roll 76, over a guide 84, over a table 88, over a guide 86, and to a take up roll 78. Supply roll 76 is trunnioned on a support, part of which is shown at 80, and take up roll 78 is trunnioned on a support, part of which is shown at 82. A suitable motor 87 or manual crank serves to advance sheets 72, 74 into welding position on table 88. On table 88, which is composed of a metal such as aluminum, and along the track of a heating unit 94 is an elastomeric pad 92, upon which increments of the thermoplastic sheets 72, 74 rest. As shown, heating unit 94 includes an inverted metal channel of U-cross section having a pair of depending rails, the lower edges of which transmit heat through a control sheet 94 to thermoplastic sheets 72, 74. The bight of channel 94 is supported by rods 102, 102, the lower extremities of which are affixed to the bight and the upper extremities of which are reciprocable in openings in a support plate 104. These rods are associated with helical springs 106 which extend between the support plate and the bight in order to permit constant pressure to be exerted by the spring bias. As shown, support plate 118 is provided with a framework 120, 122 on which are journalled two pairs of rollers 124, 124 and 126, 126, which are rotatable about axes 128, 130. These rollers are constrained for motion by flanges along an I-beam 108, the upper extremity of which is affixed to the framework. On the I-beam also are a pair of sprockets 134, 135, which are meshed with a suitable chain 137. Chain 137 is affixed to support plate 104 whereby rotation of the sprockets causes advancement of heating unit 94 in one direction or the other. As shown, the heating unit is powered through a control 96 via a pair of bus bars 98, 100, in which ride a pair of fingers 110, 112. Fingers 110, 112 are connected electrically in parallel across resistance heating elements 111, 113 via a rheostat control 115. The fingers are forced into bus bar channels 98, 100 via suitable spring biased levers 117, 119. When heating unit reaches the end of its path of travel in one direction, a limit switch 121 causes the direction of travel to reverse.

Figure 5:
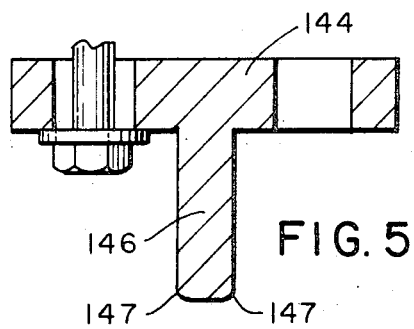
FIG. 5 is an end view of a component of the apparatus of FIG. 3.
Figure 6:
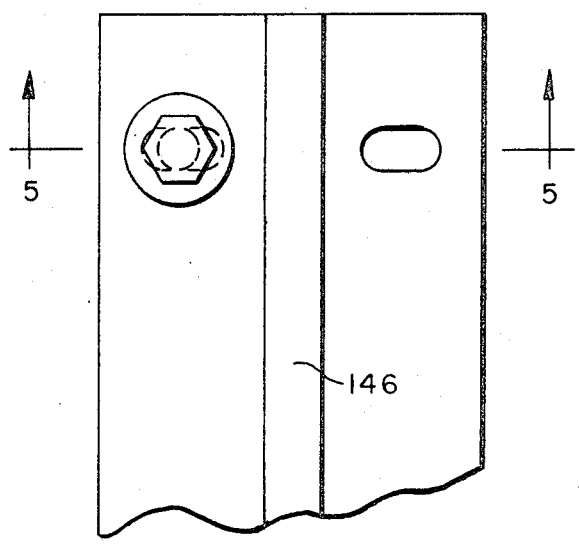
FIG. 6 is a bottom view, partially broken away, of the component of FIG. 5.
Figure 7:
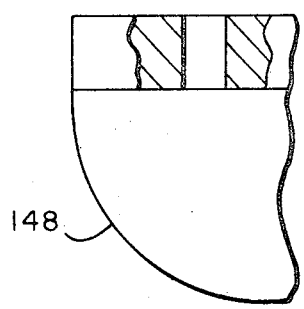
FIG. 7 is a side elevation, partly broken away, of the component of FIG. 5.

As shown in FIGS. 5, 6, and 7, the heating unit is in the form of a cross piece 144 and a depending die 146, the longitudinal edges of which are rounded at 147 and the forward and rearward edges of which are rounded at 148. Typically, the longitudinal edges are rounded with a ⅛ inch radius and the forward and rearward extremities are rounded with a 3 inch radius. A typical heated element is 16 x 24 x 1 inch, having a highly polished precision ground surface. The 16 x 24 inch longitudinal surface must maintain uniform temperature plus or minus no more than 10%. Typically the bus bars are capable of supporting 6000 watts or more.

Figure 8:
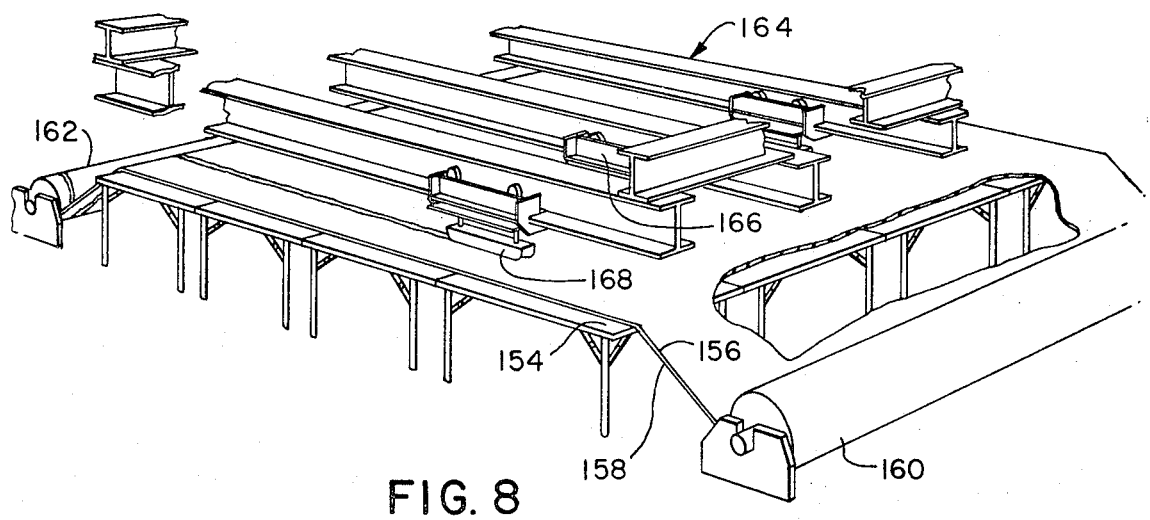
FIG. 8 is a schematic view of a system for longitudinally welding seams between superposed thermoplastic sheets, in accordance with the present invention.

With reference now to FIG. 8, there is shown a series of tables 154, over which a pair of plastic sheets 156, 158 are advanced from a supply roll 160 to a take up roll 162. Affixed above the tables and the plastic sheets is a monorail system 164 along which a series of sealing heads 166 are advanced. It will be observed that in this case the sealing heads are advanced in a direction that is transverse with respect to the direction of advancement of the plastic sheets.

Figure 9:
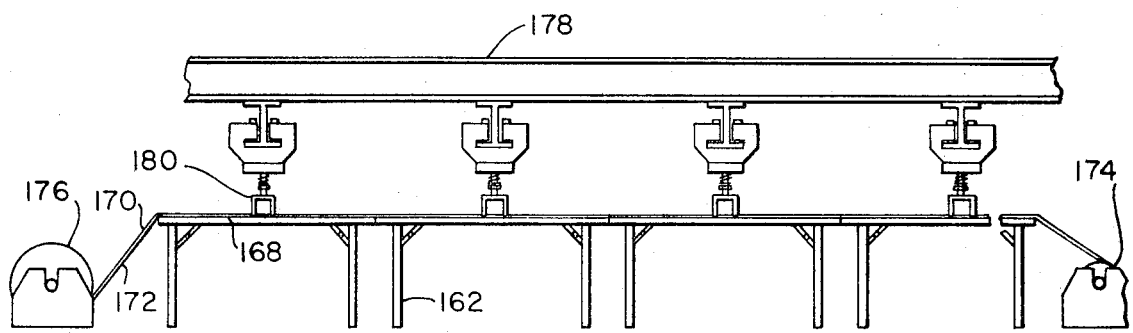
FIG. 9 is a schematic view of an alternative system for transversely welding seams between a pair of superposed thermoplastic sheets, in accordance with the present invention.
Figure 11:
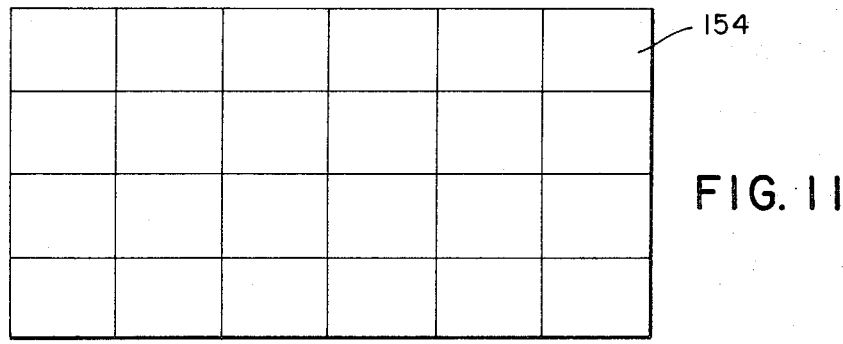
FIG. 11 is a plan view of a table system constituting a component of the table system of FIG. 9.

In FIG. 9, by contrast, a series of tables 168 are disposed beneath a pair of thermoplastic sheets 170, 172, which advance from a supply roll 174 to a take up roll 176. Longitudinally extending across the tables above the thermoplastic sheets are a system 178, on which are mounted for linear motion a series of heating heads 180. In this case, it will be observed that the direction of advancement of heating heads 180 is transverse with respect to the direction of advancement of the thermoplastic sheets.

Figure 10:
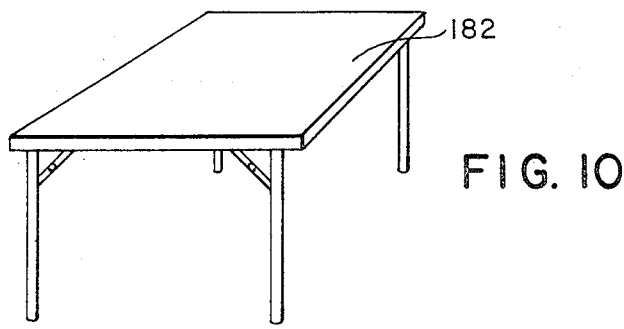
FIG. 10 is a plan view of a table constructed in accordance with the present invention.

FIG. 10 illustrates one of the series of tables 182 shown in FIGS. 8 and 9, each table including folding legs to facilitate stacking and relocating. A typical table system, in accordance with FIGS. 7 or 8 contains from 2 to 16 sealing tracks that are adjustable from spacings ranging from 2 to 6 feet. Adding additional sealing tracks obviously increases the area sealed in one cycle. Typically a table surface area is 50 by 100 feet or 5,000 square feet and the thermoplastic sheets 40 feet wide in continuous rolls of up to 5000 lineal feet. Therefore a sheet 40 feet wide may be drawn onto the table area and left connected to the master roll while being sealed. The drive system of the sealing tracks operates under a control that assures accurate speeds of from 1 to 5 feet per second. Because of the large areas processed, the cost per square foot is low.

Figure 12:
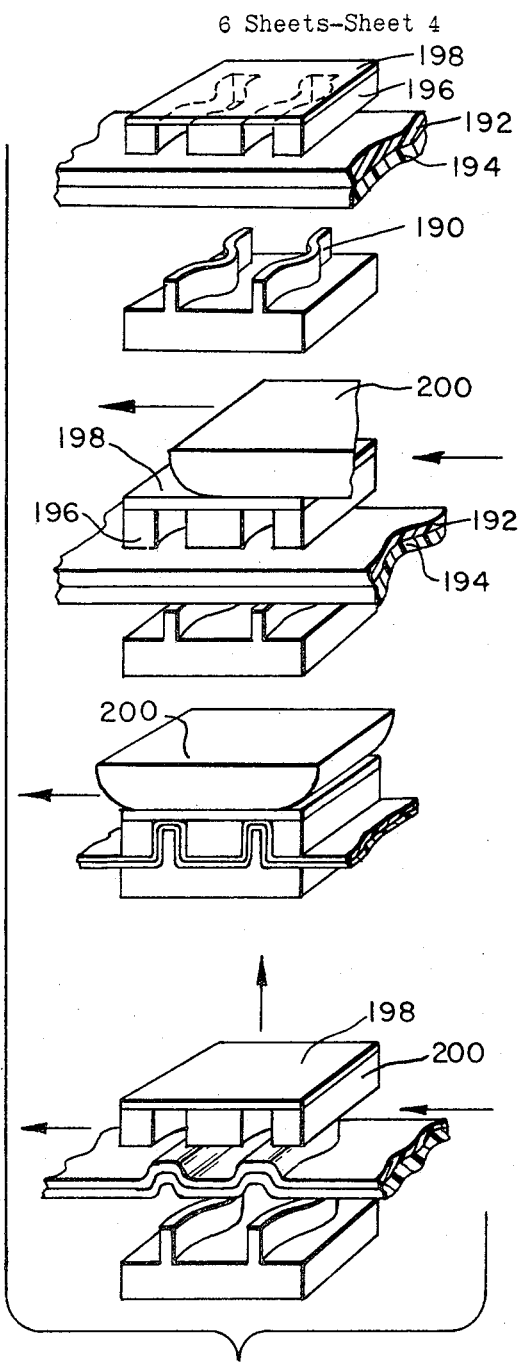
FIG. 12 illustrates materials, exaggerated in cross-section for clarity, undergoing an alternative process in accordance with the present invention.

FIG. 12 illustrates an alternative embodiment of the system of FIGS. 3 and 4. Mounted on table 11 is a system of ridges 190 composed of a metal such as aluminum or bronze. Plastic sheets 192, 194 are advanced into position over this network of ridges. In registration with these ridges are the slots of a mask 196, on which is a heat resistant resilient sheet 198. In operation, the slots of mask 196 are pressed onto the ridges 190 with the thermoplastic sheets interposed therebetween. Thereafter a heated platen 200 is advanced into contact with heat resistant resilient sheet 198 so as to weld seals into the thermoplastic sheets. The arrangement is such that the temperature, weld time, etc. of the heated platen is analogous to the temperatue and weld time of the heating elements referred to in FIGS. 3 and 4.

FIG. 13 illustrates alternative materials undergoing a process of the present invention, these materials including thermoplastic sheets 202, 204, control sheets 206, 208, and a backing plate 210, all analogous to their counterparts in FIG. 1. Additionally, interposed between elastomeric control sheet 208 and thermoplastic sheets 202, 204 in an auxiliary control sheet 212, which is analogous in composition to flexible control sheet 206. The auxiliary control sheet sometimes is needed to provide the correct degree of elastomeric backing for the thermoplastic sheets as they are sealed.

FIG. 14 illustrates a product comprising a pair of thermoplastic sheets 212, 214, having pairs of linear seals 216, 218, formed in accordance with the present invention, to define one or more channels 220 therebetween. Projecting through channels 220 are one or more elongated elements 222. In one form each of elements 222 is a rigid wooden strut. In another form each of elements 222 is a cord, for example composed of fiber or plastic.

FIG. 15 illustrates other alternative materials undergoing a process of the present invention, these materials including thermoplastic sheets 224, 226, control sheets 228, 230, backing plate 232, and auxiliary control sheet 234, all analogous to their counterparts in FIG. 1. Additionally, interposed between control sheet 228 and thermoplastic sheets 224, 226, are a pair of heat resistant strips 236, 237 which for example are of the same composition as control sheet 228. Each of these strips for example range in thickness from 15 to 30 mils. The arrangement is such that when a pair of elongated heated wipers 238, 240 are advanced in contact with control sheet 228, as shown in FIG. 16, a pair of sheets 242 result. These seals are interrupted at 246, 248 as a result of the interposition of strips 236, 237. The result is pairs of cross-channels 250, 252, through which steel bands 254, 256 may be inserted to provide a reinforced construction material.

CONCLUSION

The present invention thus provides novel processes, devices and products for imparting welded seals to relatively heavy gauge thermoplastic sheets. Since certain changes may be made in the foregoing disclosure without departing from the scope of the invention hereof it is intended that all matter shown in the accompanying drawings and described in the foregoing specification be interpreted in an illustrative and not in a limiting sense.

What is claimed is:

1. An apparatus for welding seals in thermoplastic sheets, said apparatus comprising a base, a backing plate on said base, a first control sheet on said backing plate, said first control sheet being elastomeric, a second control sheet suspended by its edges on said base in superposition above said first control sheet, means for feeding a pair of said thermoplastic sheets between said first control sheet and said second control sheet, a guide on said base above said second control sheet, a heating wiper constrained for movement along said guide in contact with said second control sheet, whereby welding occurs between said thermoplastic sheets along the line of travel of said heating wiper.

2. The apparatus of claim 1 wherein said heating wiper is composed of metal.

3. The apparatus of claim 1 wherein said flexible one of said control sheets has a free central portion and said elastomeric one of said control sheets is backed by a rigid support.

4. The apparatus of claim 1 wherein said heating wiper is heated to a temperature of at least 1,000° F.

5. The apparatus of claim 1 wherein the speed of said heating wiper is such as to cause successive increments of said thermoplastic sheets to rise to a welding temperature ranging between 300° and 400° F.

6. The apparatus of claim 1 wherein the thickness of each of said thermoplastic sheets ranges between .003 and .025 inch.

7. The apparatus of claim 1 wherein said flexible control sheet is composed of a material selected from the class consisting of polyethylene terephthalate and tetrafluoroethylene.

8. The apparatus of claim 1 wherein said elastomeric control sheet is composed of a silicone rubber.

9. An apparatus for welding seals in thermoplastic sheets, said apparatus comprising a base, a backing plate on said base, ridge means on said backing plate, slot means suspended by its edges on said base in registration with said ridge means, means for feeding a pair of said thermoplastic sheets between said ridge means and said slot means, a guide on said base above said slot means, control sheet means on said slot means, a heating wiper constrained for movement along said guide in contact with said control sheet, whereby welding occurs between said thermoplastic sheets along the line of travel of said heating wiper.

10. The apparatus of claim 9 wherein said heating wiper is composed of metal.

11. The apparatus of claim 9 wherein said heating wiper is heated to a temperature of at least 1,000° F. and the speed of said heating wiper is such as to cause successive increments of said thermoplastic sheets to rise to a welding temperature ranging between 300° and 400° F.

References Cited

UNITED STATES PATENTS

| 2,904,100 | 9/1959 | Fener | 156—583 |
| 3,198,685 | 8/1965 | Kopito et al. | 156—583 |
| 3,384,526 | 5/1968 | Abramson et al. | 156—499 |
| 3,619,334 | 11/1971 | Hauf et al. | 156—583 |
| 3,635,777 | 1/1972 | Bethge | 156—499 |
| 3,684,612 | 8/1972 | Pantazis | 156—380 X |

WILLIAM A. POWELL, Primary Examiner

U.S. Cl. X.R.

156—199, 272, 290, 306, 459, 543, 583; 161—125, 146